United States Patent [19]
Brown et al.

[11] 3,710,809
[45] Jan. 16, 1973

[54] RESERVE FUEL SYSTEM FOR LIQUEFIED GAS POWERED ENGINES

[75] Inventors: Hugh E. Brown; Vourdon H. Fricke; Henry C. Gerfen, all of St. Louis County, Mo.

[73] Assignee: Fueltime Saver Corporation, Valley Park, Mo.

[22] Filed: Jan. 21, 1971

[21] Appl. No.: 108,308

[52] U.S. Cl. ..................137/1, 137/266, 137/571
[51] Int. Cl. .....F16r 31/12, F01m 59/00, B65d 87/12
[58] Field of Search......137/266, 256, 265, 1, 10, 14, 137/571, 572; 123/136; 62/45, 55

[56] References Cited

UNITED STATES PATENTS

| | | | |
|---|---|---|---|
| 1,492,744 | 5/1924 | Poarch | 137/266 |
| 1,526,720 | 2/1925 | Satake | 137/571 |
| 2,935,075 | 5/1960 | Ringer | 137/493.1 X |
| 1,580,335 | 4/1926 | Satake | 137/266 |
| 1,617,868 | 2/1927 | Skaggs | 137/266 |
| 2,804,881 | 9/1957 | Seid et al. | 137/493 X |
| 2,818,915 | 1/1958 | Pfriffer | 137/571 X |
| 2,931,378 | 4/1960 | Davies | 137/493 X |

Primary Examiner—Henry T. Klinksiek
Assistant Examiner—Robert J. Miller
Attorney—Koenig, Senniger, Powers and Leavitt

[57] ABSTRACT

A reserve fuel system for an engine adapted to operate on liquefied petroleum gas (LPG) fuel supplied from a main fuel tank by means of a main fuel line. The system includes an auxiliary fuel line for connecting a reserve fuel tank to the main line for filling the reserve tank with liquefied fuel from the main tank and for supplying the engine with vaporized fuel from the reserve tank when the main tank is empty, and a cut-off valve in the auxiliary line to block communication between the reserve tank and the main line until the fuel in the main tank has been exhausted. The reserve tank is provided with a pressure relief valve to relieve excessive pressure in the reserve tank via the auxiliary line.

10 Claims, 3 Drawing Figures

PATENTED JAN 16 1973

Hugh E. Brown,
Vourdon H. Fricke,
Henry C. Gerfen.
Inventors.
Koenig, Senniger,
Powers and Leavitt.
Attorneys.

PATENTED JAN 16 1973 3,710,809

RESERVE FUEL SYSTEM FOR LIQUEFIED GAS POWERED ENGINES

BACKGROUND OF THE INVENTION

This invention relates to a reserve fuel system for an engine powered by LPG fuel and more particularly to such a system in which a reserve fuel tank is refillable with LPG from the main tank and which supplies vaporized gas fuel to the engine for a limited period of time after the fuel within the main tank has been depleted.

This invention is particularly concerned with a reserve fuel system adapted for use on a vehicle operable on LPG fuel which is normally compressed and stored as a liquid in a pressurized main fuel tank and delivered to the engine in the liquid state where it is converted to a vapor for induction into the engine. The use of LPG as a motor fuel is rapidly growing, especially for use in vehicles which are operated indoors (e.g., forklift trucks), because of its relatively low exhaust emissions. Although some LPG powered vehicles have a permanently installed main fuel tank which is refilled from a bulk tank, LPG powered forklifts are, for the most part, equipped with a replaceable fuel tank which is removed from the vehicle and replaced with a full tank for refueling purposes. The removed tanks are then usually refilled by a fuel supplier unless the forklift owner has bulk LPG stored on his premises. Typically, the replaceable tanks have a fuel gage installed thereon showing the fuel remaining within the tank to aid the driver in determining when the fuel tank should be replaced. The drivers, however, are reluctant to operate the forklift when the gate indicates the fuel supply is getting low because of the inconvenience and time required to refuel the forklift if the fuel is depleted when the forklift is some distance away from the refueling area. Thus, the drivers usually return for a new tank long before the tank becomes empty. Surveys show that as a result of this premature refueling, approximately eighteen percent of the fuel usually remains in the tank when it is replaced. If the forklift owner has the tanks refilled by a fuel supplier, the fuel remaining in the removed tanks is lost as the fuel suppliers have found it impractical and uneconomical to credit the owner for the remaining fuel. Thus, it costs as much to have a partially full tank refilled as it does to have an empty tank refilled. Equally as important as the increased fuel costs are the time and resulting labor costs which are lost due to the fuel tanks being replaced more frequently than would be required if the fuel were depleted before replacement of the tank.

SUMMARY OF THE INVENTION

Among the several objects of this invention may be noted the provision of a reserve fuel system for use on LPG powered vehicles as above described adapted to deliver a reserve supply of fuel for the engine upon depletion of all the fuel from within a main tank; the provision of such a system having a reserve tank which is quickly and conveniently refillable from the main tank; the provision of such a system which is safe and economical in operation, compact in size and relatively simple and inexpensive in construction; and the provision of a method for providing an engine a reserve supply of LPG fuel which effects a significant savings in fuel and labor costs.

In general, a reserve fuel system of this invention includes a reserve tank, an auxiliary fuel line for connecting the reserve tank to a main fuel line for filling the reserve tank with liquefied fuel from a main tank and supplying vaporized gas fuel to an engine from the reserve tank when the main tank is empty. A cut-off valve is included in the auxiliary line, and the reserve tank includes means responsive to increase in pressure in the reserve tank above a predetermined value for relieving pressure within the reserve tank via the auxiliary line. Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREfERRED EMBODIMENT

Figure 1:
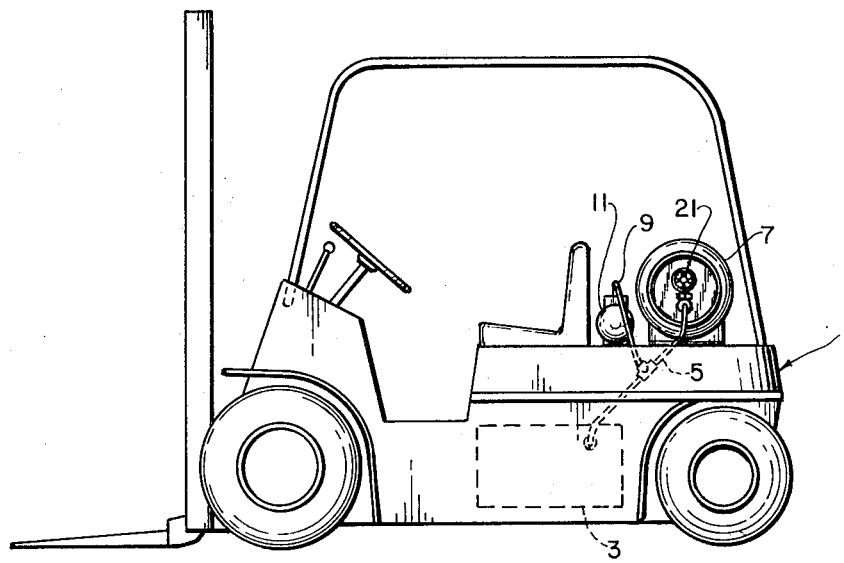
FIG. 1 is a side elevation view of a conventional forklift vehicle mounting a reserve fuel system of this invention.

Referring to the drawings, there is indicated at 1 a forklift vehicle having a conventional internal combustion engine 3 adapted to be operated on liquefied petroleum gas (LPG) fuel which is normally delivered to the engine in the liquid state by a main fuel line 5 connected to a main fuel tank 7. The reserve fuel system for providing a reserve supply of LPG fuel for the engine comprises an auxiliary fuel line 9 for connecting a reserve fuel tank 11 to the main fuel line for filling the reserve tank with liquefied fuel from the main tank and for supplying vaporized gas fuel to the engine from the reserve tank when the main tank is empty. A manually operated cut-off valve 13 is provided in the auxiliary fuel line to block communication between the filled reserve tank and the main fuel line until the fuel in the main tank has been exhausted. Means generally indicated at 15 is responsive to increase in pressure in the reserve tank above a predetermined value for relieving pressure in the reserve tank via the auxiliary fuel line.

Figure 2:
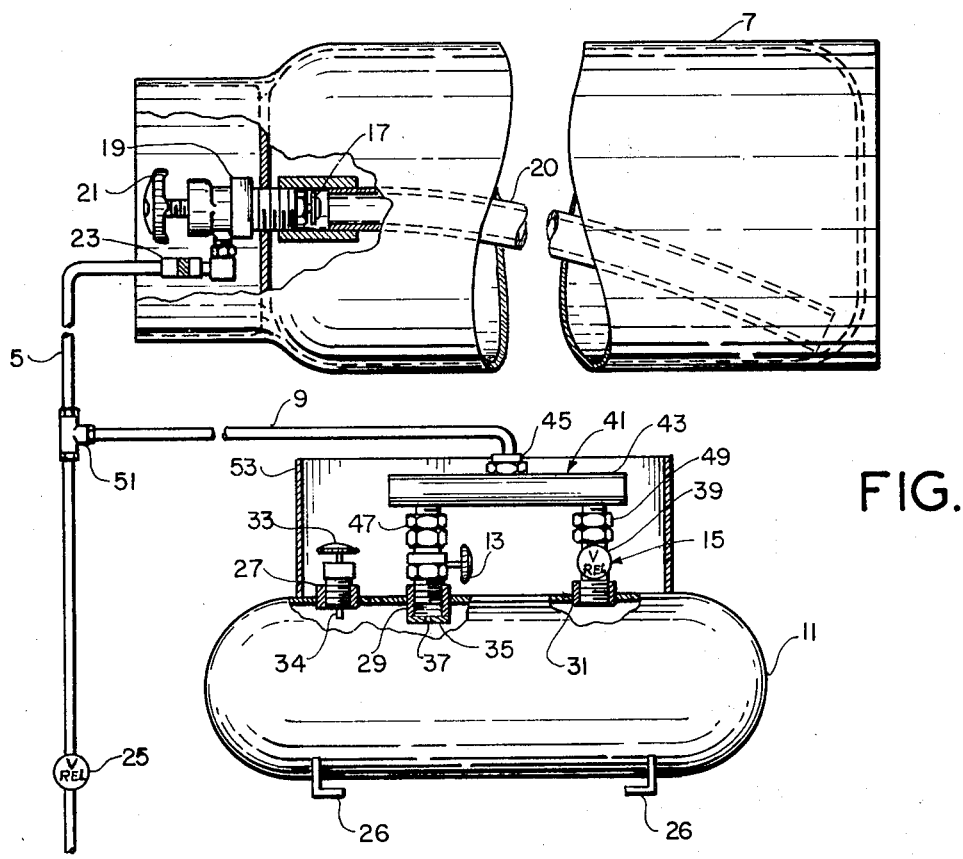
FIG. 2 is a front elevation view of the system with parts broken away.

More particularly, main fuel tank 7 is a conventional LPG motor fuel tank which may be readily removed from the vehicle and replaced with a full tank for refueling purposes. The liquefied fuel in the main tank is stored under pressure (i.e., the vapor pressure of the fuel), and the main tank is adapted to permit only liquefied fuel to flow therefrom so long as liquid is in the tank. All liquid flowing from the main tank must flow through a flow limiting valve 17 adapted to close automatically to terminate substantially all flow of fuel from the main tank if the flow rate therethrough incipiently exceeds a predetermined value (e.g., 1.5 gallons per minute). The flow limiting valve 17 is a standard safety feature included in all LPG motor fuel tanks. As shown in FIG. 2, the flow limiting valve is located at the upstream end of a unitary valve body 19 inserted in one end of the main fuel tank. A tube 20 within the main tank is connected to the back end of valve body 19 and slopes downwardly toward the bottom of the tank to ensure that liquid is withdrawn from the tank so long as liquid is in the tank. A main tank cut-off valve 21 is included in the unitary valve body downstream from the flow limiting valve for shutting off all flow of fuel from the main tank. Main fuel line 5 has a conventional quick-disconnect fitting 23 at its upstream end for quickly connecting or disconnecting the main fuel line from the outlet of valve body 19 to facilitate rapid changing of the main fuel tank. A safety relief valve 25 is included in the main fuel line to automatically relieve pressure from therewithin if the pressure exceeds a predetermined value (e.g., 350 psig). This main fuel line relief valve is a standard safety feature on conventional LPG motor fuel systems.

As shown in FIG. 1, reserve fuel tank 11 is preferably located near the main fuel tank outlet and is secured to the vehicle at a location that permits the vehicle driver to operate the reserve system as will be hereinafter described. Reserve tank 11 is a relatively small cylindrical tank with hemispheric ends made of steel or the like, and is adapted to hold a small amount (e.g., 0.2 gallon) of liquefied fuel and to withstand relatively high internal working pressures (e.g., 650 psig). The 0.2 gallon of fuel in the reserve tank is enough to power the forklift vehicle for approximately 20 minutes.

Referring now to FIG. 2, the reserve tank is shown in its operative position mounted on two angle iron supports 26 which are welded to the lower side of the tank and secured to the vehicle. The upper portion of the tank includes three pipe collars 27, 29 and 31 welded in the tank and each having a central opening threaded to receive components as will be hereinafter described. A manually operated vent valve 33 is mounted in collar 27 for venting fuel from within the reserve tank. Vent valve 33 has a dip tube 34 attached to its lower end which extends downwardly into the reserve tank to the level which the liquefied fuel would assume if the reserve tank were 90 percent full.

Below collar 29 is a plate 35 having an orifice 37 to restrict the flow of liquid into the reserve tank to a rate less than the predetermined rate which can occur through the flow limiting valve 17, and to permit the withdrawal of vaporized gas fuel from within the reserve tank at a sufficient rate to supply the engine. Cut-off valve 13 is mounted in the upper portion of collar 29. Pressure relief means 15 is constituted by a pressure actuated relief valve 39 threaded in collar 31 and adjusted to relieve pressure from within the reserve tank when the differential pressure across the relief valve exceeds a predetermined value (e.g., 300 psig).

As shown in FIG. 2, the auxiliary line sides of cut-off valve 13 and of relief valve 39 (its exhaust side) are interconnected to the auxiliary line 9 via a fitting assembly generally indicated at 41 for delivering liquefied or vaporized fuel from the reserve tank to the engine via orifice 37, and for returning any excess fuel from the relief valve to the system. The fitting assembly includes a common distribution tube 43 having a fitting 45 near its center adapted to receive one end of the auxiliary fuel line 9, a fitting 47 at one end (its left end) for receiving the auxiliary line side cut-off valve 13, and a fitting 49 at its other end connected to the exhaust side of the relief valve 39. The main line end of the auxiliary fuel line is connected to the main line 5 via a T-fitting 51. An impact guard 53 is secured to the upper portion of the reserve tank to protect the valves and fitting assembly from being damaged in the event the reserve tank is inadvertently struck.

In operation, starting with a full main fuel tank 7 at room temperature and with an empty reserve tank 11 at atmospheric pressure, the main tank cut-off valve 21 is opened to permit LPG fuel (e.g., propane which has a vapor pressure of approximately 115 psig at room temperature) to flow through the flow limiting valve 17 into main fuel line 5 and auxiliary fuel line 9. Cut-off valve 13 is opened to permit the liquefied fuel in the auxiliary line to flow through orifice 37 into the reserve tank to fill the later with liquefied fuel. As the liquefied fuel passes through the orifice into the reserve tank, the liquefied fuel will boil because the pressure within the reserve tank is substantially less than the vapor pressure of the liquefied fuel. The boiling fuel absorbs heat from the reserve tank and from the surroundings so that the reserve tank and the liquefied fuel therein are substantially cooled. When the reserve tank is filled with liquefied fuel, the chilled liquefied fuel therein is pressurized to the same pressure as the liquefied fuel within the main tank, i.e., approximately 115 psig. The vehicle driver may verify that the reserve tank is substantially filled with liquefied fuel by momentarily opening vent valve 33. If droplets of liquefied fuel are exhausted therefrom, the reserve tank is more than 90 percent full of liquefied fuel. The driver then closes reserve tank cut-off valve 13 to block communication between the reserve tank and the main fuel line so the fuel within the reserve tank may be conserved for use after the fuel within the main tank has been depleted.

As the chilled liquefied fuel within the closed-off reserve tank 11 is warmed to ambient temperature by the surrounding atmosphere or to an elevated temperature by heat given off by the engine, the pressure within the reserve tank substantially increases. If the pressure within the reserve tank exceeds the pressure within auxiliary fuel line 9 by the predetermined value for which pressure relief valve 39 was set (i.e., 300 psig), the latter will open automatically to relieve pressure within the reserve tank. The fuel exhausted by the relief valve is returned to the system via fitting assembly 41 and the auxiliary line to prevent hazardous venting of fuel to the atmosphere. Although the relief valve 39 is only actuated if the differential pressure between the reserve tank and the auxiliary line exceeds the predetermined value, the maximum pressure within the auxiliary line is limited to the predetermined value of the main fuel line relief valve 25 (i.e., 350 psig), so that the pressure within the reserve tank cannot exceed the combined predetermined pressures of the two relief valves, i.e., 300 psig plus 350 psig, or 650 psig (the working pressure of the reserve tank).

Upon depletion of the fuel within main tank 7, the driver preferably closes valve 21 and opens cut-off valve 13 to permit the fuel stored within the reserve tank to supply the engine to enable the fork-lift truck to complete its immediate task and to return to the refueling area to replace the empty main fuel tank with a full one. Since orifice 37 (through which the fuel normally enters and exits the tank) is located at the top of reserve tank 11, only vaporized fuel may be withdrawn therefrom and supplied to the engine. As vapor is withdrawn from the reserve tank, the pressure therein is lowered below the vapor pressure of the liquefied fuel remaining within the reserve tank, causing the liquefied fuel to boil. The boiling fuel absorbs heat from the reserve tank and from the surroundings thereby chilling the reserve tank and the liquefied fuel therein which in turn reduces the vapor pressure of the liquefied fuel. The boiling, however, produces more vaporized fuel which will continue to supply the engine. Thus, when the forklift truck arrives at the refueling area, the reserve tank and fuel therein are normally chilled well below room temperature (e.g., 10°F.) so that the vapor pressure of the fuel is approximately 30 psig, for example. The main tank cut-off valve 21 is closed and the empty main tank is replaced with a full one.

If the temperature of the fuel main tank 7 is greater than the temperature of the reserve tank, the vapor pressure of the main tank (i.e., approximately 115 psig at 70°F.) will be greater than the vapor pressure of the fuel within the chilled reserve tank (i.e., 30 psig at 10°F.) thereby causing fuel to flow from the main tank into the reserve tank when cut-off valve 21 is opened. Such a pressure difference between the reserve tank and the full main tank will be sufficient to cause the reserve tank to be filled with liquefied fuel in a relatively short time (e.g., thirty seconds). Cut-off valve 13 may then be closed to block off the reserve tank from auxiliary line 9. However, under certain circumstances (i.e., when the reserve tank has been warmed to room temperature or when the full main fuel tank has been stored outdoors in winter weather so that its temperature is approximately equal to the temperature of the chilled reserve tank), the vapor pressure within the reserve tank will be nearly equal to or greater than the vapor pressure within the full main tank so that fuel will not flow from the main tank to the reserve tank. To decrease the pressure within the reserve tank, main tank cut-off valve 21 is closed and the engine is supplied with vaporized fuel from the reserve tank until the fuel therein has been depleted. At that time, cut-off valve 13 may be opened to fill the reserve tank from the main tank as heretofore described.

Figure 3:
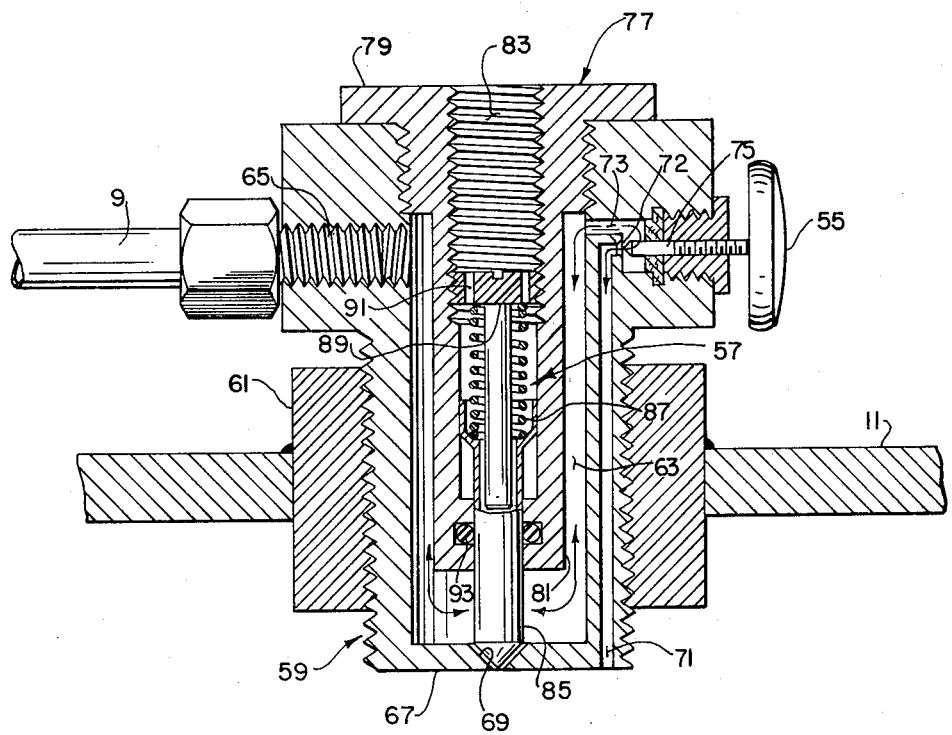
FIG. 3 is an enlarged partial vertical section of a modification of a reserve fuel tank of the system showing a cut-off valve and a pressure relief valve combined in a unitary valve body.

FIG. 3 illustrates a modification of a reserve tank 11 of this invention wherein a cut-off valve 55 (which corresponds to cut-off valve 13) and a spring-operated relief valve assembly generally indicated at 57 (which corresponds to means 15 for relieving pressure in the reserve tank via the auxiliary fuel line 9) are combined in a unitary valve body, generally indicated at 59. The valve body 59 is threaded into a collar 61 welded to the uppermost portion of reserve tank 11. The valve body has a central chamber 63 receiving the relief valve assembly, a port 65 connected to the auxiliary fuel line 9 and registering with the central chamber 63, a closed lower end 67, a valve seat 69 in the lower end, and a bore 71 in a vertical side wall. Liquefied fuel normally enters the reserve tank and vaporized fuel normally exits the tank via the bore 71. The upper end of the bore constitutes a valve seat 72 which registers with an opening 73 which is in communication with central chamber 63 thereby permitting fuel to flow in and out of the reserve tank as indicated by the arrows. A needle valve stem 75 of valve 55 engages valve seat 72 at the upper end of the bore to cut off flow in an out of the reserve tank. The small diameter of the bore 71 serves as an orifice to restrict the flow of liquefied fuel into the reserve tank to a rate less than the predetermined rate of the flow limiting valve 17 and permits vaporized fuel to be withdrawn from the reserve tank at a sufficient rate to supply the engine.

Relief valve assembly 57 has a relief valve body generally indicated at 77 with an upper portion 79 threaded into and sealing central chamber 63, a lower portion 81 of smaller cross section than central chamber 63, and a threaded bore 83 extending down into lower portion 81. A valve stem 85 protrudes downwardly through the lower end of lower portion 81 and engages valve seat 69. Valve stem 85 is biased to a closed position by a spring 87. The force the spring exerts on the valve stem (and consequently the pressure at which the relief valve will be actuated) may be adjusted by moving a threaded cap 89 up or down in threaded bore 83. Cap 89 has holes 91 included therein permitting the lower portion of bore 83 between the cap and the lower end of lower portion 81 to be in communication with the atmosphere so that the pressure at which relief valve assembly 57 is actuated depends only on the pressure in reserve tank 11. An O-ring 93 in a groove in the lower end of lower portion 81 seals valve stem 85.

The operation of a reserve fuel system of this invention with the above-mentioned modifications is essentially the same as heretofore described. However, in the case of the modification, the reserve tank pressure at which the relief valve assembly 57 will open to relieve pressure from within the reserve tank is not dependent on the pressure of the fuel in the auxiliary fuel line 9, but rather is responsive to the differential pressure between the ambient atmosphere and the pressure within the reserve tank. If the reserve tank pressure at which relief valve assembly 57 is set to relieve is slightly higher than the predetermined pressure of relief valve 25 in the main fuel line (e.g., relief valve assembly 57 is set for 400 psig and relief valve 25 is set for 350 psig) the pressure within the reserve tank may not exceed the relief pressure of relief valve assembly 57 (400 psig). Thus, the reserve tank 11 may be constructed to withstand a lower working pressure, i.e., 400 psig rather than 650 psig.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A reserve fuel system for an engine operable by liquefied gas fuel from a main tank connected to the engine by a main fuel line comprising a reserve tank, an auxiliary fuel line for connecting the reserve tank to the main line for filling the reserve tank with liquefied fuel from the main tank and supplying vaporized gas fuel to the engine from the reserve tank when the main tank is empty, a cut-off valve in said auxiliary line, and means responsive to increase in pressure in the reserve tank above a predetermined value for relieving pressure in the reserve tank and for returning vented fuel to the main line via the auxiliary line thereby preventing the hazardous venting of fuel to the atmosphere.

2. A system as set forth in claim 1 wherein said main tank delivers fuel to the main line via a main cut-off valve, and wherein there is provided a flow limiting valve controlling the flow through said main line and adapted to terminate substantially all flow from the main tank if the flow rate therethrough incipiently exceeds a predetermined rate, and wherein the auxiliary fuel line is connected to the main line downstream from the main cut-off valve, said system further including means for restricting the rate of flow into the reserve tank to a value less than said predetermined rate.

3. A system as set forth in claim 1 wherein said means for relieving pressure from within said reserve tank comprises a relief valve with its exhaust side in communication with said auxiliary line on the main line side of said auxiliary line cut-off valve.

4. A system as set forth in claim 3 wherein said means for restricting the rate of flow into the reserve tank comprises an orifice within said auxiliary line for restricting the flow rate of liquid fuel into the reserve tank to a value less than said predetermined flow rate and for permitting vaporized gas fuel to flow from the reserve tank to the engine at a flow rate sufficient to supply the engine.

5. A system as set forth in claim 4 wherein said reserve tank has a manually controlled valve for venting fuel therefrom.

6. A system as set forth in claim 5 wherein said auxiliary line, relief valve and vent valve are connected to the portion of said reserve tank which is uppermost when the latter is in its operative position.

7. A system as set forth in claim 4 having a valve body connected to the tank, and having said auxiliary line connected thereto, said body having said cut-off valve and also said relief valve and said orifice therein.

8. A system as set forth in claim 7 wherein said relief valve is responsive to pressure differential between the ambient atmospheric pressure and the pressure within the reserve tank.

9. The method of providing a reserve supply of fuel for an engine normally supplied with liquefied gas fuel via a main fuel line from a main tank, comprising:
delivering liquefied gas fuel from the main tank via said main fuel line and an auxiliary fuel line to a reserve tank, thereby to substantially fill it with liquefied gas fuel;
terminating the flow of fuel from the main tank to the main line whenever this flow exceeds a predetermined rate whereby the flow of vaporized gas fuel from the auxiliary fuel line to the reserve tank is restricted to a rate below the predetermined rate;
blocking communication between the filled reserve tank and the main fuel line after filling and until the fuel in the main tank has been exhausted;
placing the reserve tank in communication with the main fuel line; and
supplying vaporized gas fuel to said engine via the auxiliary and main fuel lines to continue to power the engine for a limited period of time after depletion of the main fuel supply.

10. The method of claim 9 which further includes maintaining the pressure in said reserve fuel tank below a predetermined value by relieving the pressure in the reserve tank via the auxiliary line upon any incipient pressure increase in the reserve tank above said predetermined value.

* * * * *